United States Patent Office 3,093,687
Patented June 11, 1963

3,093,687
ORGANOBORON COPOLYMERS
Sheldon L. Clark, Eggertsville, June T. Duke, Tonawanda, and Trescott B. Larchar and William K. Taft, Lewiston, N.Y., assignors to Olin Mathieson Chemical Corporation
No Drawing. Filed Sept. 4, 1959, Ser. No. 838,356
9 Claims. (Cl. 260—606.5)

This invention relates to organoboron copolymers and to a method for their preparation. The organoboron copolymers are prepared by the copolymerization of conjugated diolefin hydrocarbons and compounds of the class $RR'B_{10}H_8(CR''CR''')$ wherein R and R' are each selected from the class consisting of hydrogen and an alkyl radical containing from one to five carbon atoms, wherein R'' and R''' are each selected from the class consisting of hydrogen, an alkyl radical and a monoalkenyl hydrocarbon radical, at least one of R'' and R''' being a monoalkenyl hydrocarbon radical, the total number of carbon atoms in R'' and R''' taken together not exceeding eight. Further, this invention relates to solid propellant compositions containing said organoboron copolymers and to a method for their preparation.

Compounds of the above class can be prepared by the reaction of decaborane or an alkylated decaborane having one to two alkyl groups containing 1 to 5 carbon atoms in each alkyl group with an acetylenic hydrocarbon containing at least one olefinic bond and from four to ten carbon atoms in the presence of a wide variety of ethers, nitriles, amines or sulfides. The preparation of these compounds is described in application Serial No. 813,032, filed May 13, 1959, of Ager, Heying and Mangold. For example, $B_{10}H_{10}(CHCC(=CH_2)CH_3)$ can be prepared by reacting for about 12 hours at 125° C. a mixture of decaborane, isopropenylacetylene, and tetrahydrofuran in an autoclave.

The preparation of decaborane is known in the art. Lower alkyl decaboranes, such as monomethyldecaborane, dimethyldecaborane, monoethyldecaborane, diethyldecaborane, monopropyldecaborane and the like, can be prepared, for example, according to the method described in application Serial No. 497,407, filed March 28, 1955, now U.S. Patent No. 2,999,117, by Elmar R. Altwicker, Alfred B. Garrett, Samuel W. Harris and Earl A. Weilmuenster.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention, when incorporated with oxidizers, are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withsand ordinary handling.

The liquid products prepared according to the method of this invention can be cured to form solid products.

In accordance with the present invention, it was discovered that compounds of the above class can be copolymerized with conjugated diolefin hydrocarbons, such as 1,3-butadiene and isoprene, to produce organoboron copolymers. The organoboron copolymers are formed by a conventional emulsion polymerization process. In such a process, the organoboron compound of the above class and the conjugated diolefin hydrocarbon are charged to a reactor containing water, a soap and a catalyst such as azo bis(isobutyronitrile) or potassium persulfate. A modifier, such as n-dodecyl mercaptan or tertiary dodecyl mercaptan, whose function in emulsion polymerization system is to control the average molecular weight, is usually included. The polymerization system is then rapidly brought to a suitable reaction temperature, generally between 30° and 80° C. when using potassium persulfate as a catalyst and 45° to 80° C. when using azo isobutyric dinitrile as a catalyst, and the system is agitated for from about 12 to 72 hours. After the polymerization has proceeded to the desired degree of conversion and has been shortstopped if desired, the unreacted diolefin is vented off and the contents of the reactor are allowed to cool to room temperature. Any unreacted organoborane monomer which settles out at this point is removed, and the latex is coagulated, usually with a dilute mineral acid such as hydrochloric acid. The copolymer which is thus precipitated is washed in water with methanol to remove any emulsifier and organoborane monomer still remaining, and the washed elastomer is then dried.

The ratio of monomers can vary widely, generally being from 10 to 99 and preferably from 60 to 95 parts of borane monomer of the above class per 100 total parts of monomer, the remainder being conjugated diolefin hydrocarbon. The amount of catalyst employed can also be varied considerably, although amounts in excess of 0.1 part of azo isobutyric dinitrile or 0.03 part of potassium persulfate per 100 parts of monomer usually are employed, depending on the rate of polymerization desired. The amounts of emulsifier and water employed are preferably between 3 and 10 parts and 180 and 300 parts respectively per 100 total parts of monomer.

The formation of the organoboron copolymers is more particularly described in the following examples. In the examples, the formula parts are parts by weight. The emulsifier, dimethyl benzyl $C_{16}$ alkylammonium chloride (Ammonyx T), as received and used is a 25 weight percent aqueous solution. All $B_{10}H_{10}(CHCC(=CH_2)CH_3)$ samples were distilled before use in polymerizations except that used in Example XIII.

EXAMPLE I

| Material | Formula parts | Grams used |
|---|---|---|
| $B_{10}H_{10}(CHCC(=CH_2)CH_3)$ | 80 | 5.6 |
| Butadiene | 20 | 1.4 |
| Sulfole (tertiary dodecyl mercaptan) | 0.5 | 0.0368 |
| Sodium fatty acid soap | 4.3 | 0.301 |
| $K_2S_2O_8$ | 0.23 | 0.016 |
| Water | 180 | 12.60 |

Soap, water and potassium persulfate were mixed together and put into an 8 oz. bottle, along with the $B_{10}H_{10}(CHCC(=CH_2)CH_3)$ monomer. The Sulfole then was added, and finally, the butadiene was added, using an excess to flush the bottle. The bottle then was tightly capped, placed in a protective cage and put in a water bath at 48° C. The bottle was rotated end over end in the water bath for a reaction time of 24 hours. One-half ml. of a 5 percent aqueous solution of hydroquinone was injected into the bottle as a shortstop. Excess pressure was vented from the bottle with a hypodermic needle and the bottle was left sealed overnight. A good emulsion was evident in the bottle. Subsequent examination of the bottle containing the polymerization products indicated a layering in the emulsion. The bottle was opened and the contents transferred to a 400 ml. beaker. Additional water was added and a solid granular material formed a layer at the top of the liquid. This was removed, placed in a medium grade sintered glass filter and washed several times with tap water. This solid material resembled the original $B_{10}H_{10}(CHCC(=CH_2)CH_3)$ monomer. The solid material was placed in a 100 ml. round bottom flask and a vacuum was applied for three hours to remove the water. The solid material, apparently unreacted $B_{10}H_{10}(CHCC(=CH_2)CH_3)$, which was recovered from the polymerization reaction weighed 3.7 g. and had a melting point of 44° C.

The liquid remaining after the removal of the solid material was a creamy latex. Dilute hydrochloric acid was added slowly while stirring with a glass rod. An elastomeric solid precipitated leaving a clear serum. The elastomer was washed several times in cold water, then several times in warm water and placed in a vacuum desiccator. The elastomeric material was removed from the desiccator and was a doughy mass, obviously containing a quantity of unreacted $B_{10}H_{10}(CHCC(=CH_2)CH_3)$ as evidenced by crystalline portions. This doughy mass was worked with a stirring rod under several portions of methanol, and then redried in the vacuum desiccator. The dry product was a soft elastic material, very nearly liquid. The elastic material recovered weighed 1.5 g. and was shown by duplicate chemical analyses to contain 24.0, 23.8 percent boron.

EXAMPLE II

| Material | Formula parts | Grams used |
|---|---|---|
| $B_{10}H_{10}(CHCC(=CH_2)CH_3)$ | 80 | 5.20 |
| Butadiene | 20 | 1.30 |
| Sulfole | 0.5 | 0.0325 |
| Sodium fatty acid soap | 4.3 | 0.2795 |
| $K_2S_2O_8$ | 0.23 | 0.0149 |
| Water | 180 | 11.700 |

Soap, water and potassium persulfate were weighed into an 8 oz. bottle. The $B_{10}H_{10}(CHCC(=CH_2)CH_3)$ monomer was added, followed by the Sulfole. The bottle was cooled and the butadiene was added with an excess to purge the bottle. The bottle was placed in the bath at 48° C. After approximately 40 hours, the bath temperature was found to be 58° C. and was readjusted to 50° C. After a total of 47 hours of reaction time, the bottle was removed from the bath and cooled to room temperature. A 100 ml. flask with stopcock was weighed at atmospheric pressure, then evacuated and weighed again. The flask and a length of rubber tubing with a hypodermic syringe was cooled in a Dry Ice bath. The syringe was inserted in the rubber gasket in the bottle and the stopcock of the flask was opened to remove and weigh the unreacted butadiene. A total of 0.2675 g. of unreacted butadiene was recovered, indicating a 79.2 percent conversion of butadiene. The bottle was opened and some solid material (granular) found to be present was filtered out. The solid material was washed with water and methanol. The methanol dissolved the unreacted $$B_{10}H_{10}(CHCC(=CH_2)CH_3)$$

and a small amount of elastic solid material remained. This latter was washed thoroughly with methanol and then dried in a vacuum oven at room temperature. The latex remaining after removal of the solid material was coagulated with dilute hydrochloric acid. An additional quantity of elastic solid was obtained. This was thoroughly washed in water, then in methanol, and dried in a vacuum oven at room temperature. The elastic product which was obtained from the solid material weighed 0.14 g. The elastic product which was obtained from the latex weighed 1.15 g. and was found by duplicate chemical analyses to contain 32.6, 32.6 percent boron. The methanol soluble material was found to weigh 1.56 g. The 32.6 percent boron found in the elastic material from the latex corresponds to 57 percent of $B_{10}H_{10}(CHCC(=CH_2)CH_3)$ in the product.

EXAMPLE III

| Material | Formula parts | Grams used |
|---|---|---|
| $B_{10}H_{10}(CHCC(=CH_2)CH_3)$ | 80 | 5.20 |
| Butadiene | 20 | 1.30 |
| Ammonyx T (dimethyl benzyl $C_{16}$ alkyl ammonium chloride) | 17.92 | 1.20 |
| Sulfole | 0.5 | 0.032 |
| AIBN (azo isobutyric dinitrile) | 0.525 | 0.0339 |
| Water | 166.56 | 10.8 |

The AIBN was weighed into an 8 oz. bottle. The Ammonyx T soap, water, $B_{10}H_{10}(CHCC(=CH_2)CH_3)$ monomer, and Sulfole were added in that order. The bottle was cooled and then the butadiene was added. The bottle was placed in the polymerization bath as in Example I. After about 40 hours, the bath temperature was found to be 58° C., and readjusted to 50° C. The bottle was removed from the bath after a total of 47 hours reaction time, and then cooled to room temperature. A 100 ml. flask with a stopcock was weighed at atmospheric pressure, then evacuated and weighed again. The flask and a length of rubber tubing with a hypodermic syringe was cooled in a Dry Ice bath. The syringe was inserted in the rubber gasket in the bottle and the stopcock of the flask opened. The butadiene was removed and found to weigh 0.2712 g., corresponding to a 79.2 percent conversion of butadiene. The bottle was opened, and some solid material (granular) which was present was filtered out, and then washed with water and methanol. The methanol dissolved any unreacted $$B_{10}H_{10}(CHCC(=CH_2)CH_3)$$

from the solid material and a small amount of solid elastic material remained. This was washed thoroughly with methanol and then dried in a vacuum oven at room temperature. The latex remaining after removal of the solid material was coagulated with dilute hydrochloric acid. An additional small quantity of elastic solid was obtained. This was thoroughly washed in water, then methanol, and then dried in a vacuum oven at room temperature. An attempt was made to collect all the methanol soluble material (presumably excess $$B_{10}H_{10}(CHCC(=CH_2)CH_3)$$

to determine the recovery, and this was found to weigh 4.4 g. The elastic product from the solid material weighed 1.05 g. and was found by chemical analysis to contain 30.8, 30.4 percent boron. The elastic product from the latex was found to weigh 1.4 g. and was found by duplicate chemical analyses to contain 31.6, 31.3 percent boron.

EXAMPLE IV

| Material | Formula parts | Grams used |
|---|---|---|
| $B_{10}H_{10}(CHCC(=CH_2)CH_3)$ | 90 | 5.853 |
| Butadiene | 10 | 0.65 |
| Sulfole | 0.5 | 0.0348 |
| Sodium fatty acid soap | 4.3 | 0.2810 |
| $K_2S_2O_8$ | 0.23 | 0.0154 |
| Water | 180 | 11.7786 |

The soap, water and potassium persulfate were weighed into an 8 oz. bottle. The $B_{10}H_{10}(CHCC(=CH_2)CH_3)$ monomer was added, the Sulfole was added, the bottle was cooled, and butadiene was added in excess to purge. The bottle was placed in the bath at 51° C. and allowed to react for 48 hours. The bottle was vented and opened. The latex was a jelly-like semi-solid. Some solid material was present. The entire contents of the bottle were washed into a beaker, and were then filtered through a coarse sintered glass frit. The filtered latex was transferred to a beaker. The solid material left on the filter appeared to be a mixture of rubber and $$B_{10}H_{10}(CHCC(=CH_2)CH_3)$$

This solid material was then rinsed with methanol and a small quantity of a solid elastic was left. The methanol rinsings were transferred to a beaker. Dilute hydrochloric acid was added to the filtered latex and a large quantity of white elastic material coagulated. The serum was discarded and the material was covered with water to soak overnight. The solid material recovered from the latex was given several additional rinsings in water and then methanol. It was placed with the solid elastic in the vacuum desiccator. The elastic from the latex weighed 4.31 g. while the elastic from the solid material not in the emulsion weighed 0.8 g.

EXAMPLE V

| Material | Formula parts | Grams used |
|---|---|---|
| $B_{10}H_{10}(CHCC(=CH_2)CH_3)$ | 90 | 5.8479 |
| Butadiene | 10 | 0.65 |
| Ammonyx T | 17.92 | 1.1989 |
| Sulfole | 0.5 | 0.0343 |
| AIBN | 0.525 | 0.0349 |
| Water | 166.56 | 10.8092 |

The AIBN was weighed into a bottle, followed by the soap, water, $B_{10}H_{10}(CHCC(=CH_2)CH_3)$ and then the Sulfole. The bottle was cooled and butadiene was added in excess to purge. The bottle was placed in the bath at 51° C. for a reaction time of 48 hours. Excess butadiene was vented, and the bottle was opened. The latex was transferred to a beaker and the bottle was rinsed with water which was added to the latex. A quantity of soft, sticky, rubbery material (yellow) was left in the bottle where it had adhered to the glass. This was scraped out, placed in a small beaker and found to weigh 1.44 g. The solid was washed in water, then methanol. Not all of the sticky solid could be removed by spatula, so a small quantity of benzene was added, the material was dissolved and added to the beaker. When the benzene had evaporated, the elastic material was washed with water and methanol and then placed in a vacuum desiccator at room temperature. All methanol rinsings (which should have contained any unreacted $$B_{10}H_{10}(CHCC(=CH_2)CH_3)$$

were saved in the beaker. Dilute hydrochloric acid was added to the latex until a clear serum was obtained. A large lump of white elastic material coagulated. This was washed in water several times, then left in methanol overnight. The white elastic material coagulated from the latex was washed several times in methanol. The material was tough and elastic, with good recovery. A flame test showed it to burn evenly at a rather slow rate with a green and yellow flame. The product was put in a petri dish and placed in the vacuum oven at room temperature overnight. The dried material coagulated from the latex weighed 5.25 g. and was found by duplicate chemical analyses to contain 17.2, 14.5 percent boron. The solid material not in emulsion, which weighed 1.44 g., was found by duplicate chemical analyses to contain 28.9, 27.4 percent boron. The methanol soluble material was found to weigh 1.50 g.

EXAMPLE VI

| Material | Formula parts | Grams used |
|---|---|---|
| $B_{10}H_{10}(CHCC(=CH_2)CH_3)$ | 90 | 4.50 |
| Butadiene | 10 | 0.50 |
| Ammonyx T | 17.92 | 0.896 |
| Sulfole | 0.5 | 0.025 |
| AIBN | 0.525 | 0.026 |
| Water | 166.56 | 8.328 |

The charge was prepared in an 8 oz. bottle and polymerized at 50° C. for 48 hours. The latex was coagulated as in the previous examples with hydrochloric acid. A solid material, separate from the coagulum, contained a sticky elastic and $B_{10}H_{10}(CHCC(=CH_2)CH_3)$. This was washed with water and methanol in a dish. The elastic coagulated from the latex (coagulum) was thoroughly washed with water and methanol, and placed in a beaker. Both samples were dried in a vacuum oven at room temperature. The solid material was found to weigh 0.3414 g. The elastic material coagulated from the latex was found to weigh 0.8226 g., and was found by duplicate chemical analyses to contain 33.6, 34.0 percent boron.

EXAMPLE VII

| Material | Formula parts | Grams used |
|---|---|---|
| Butadiene | 5.0 | 0.25 |
| $B_{10}H_{10}(CHCC(=CH_2)CH_3)$ | 95.0 | 4.75 |
| Ammonyx T | 17.92 | 0.896 |
| Sulfole | 5.0 | 0.24 |
| AIBN | 0.525 | 0.0264 |
| Water | 166.56 | 8.328 |

The materials were charged in a 2 oz. square bottle with a metal cap containing self-sealing gaskets. The bottle was placed in the bath at 50° C. After about 17 hours, the bath temperature was at 56° C. The bottle was left in the bath for a total of 48 hours, at approximately 50° C. The latex was coagulated with dilute hydrochloric acid. A soft, semi-liquid product was obtained which was dried at room temperature in a vacuum desiccator. The dried product weighed 0.5974 g. and was found by chemical analysis to contain 28.9 percent boron.

Examples VIII through XI shown in Table I were performed in a manner similar to that employed in Example X.

EXAMPLE X

| Material | Formula parts | Grams used |
| --- | --- | --- |
| Butadiene | 10.0 | 5.0 |
| $B_{10}H_{10}(CHCC(=CH_2)CH_3)$ | 90.0 | 45.0 |
| Ammonyx T | 17.92 | 8.96 |
| Sulfole | 0.5 | 0.25 |
| AIBN | 1.00 | 0.5 |
| Water | 166.56 | 83.28 |

The materials were charged to an 8 oz. bottle which was placed in the bath at 60° C. for 48 hours. The soft elastic product obtained weighed 12.5149 g., which corresponded to a 25 percent conversion, and was found by duplicate chemical analyses to contain 35.0, 34.9 percent boron.

EXAMPLE XII

| Material | Formula parts | Grams used |
| --- | --- | --- |
| Butadiene | 40 | 15.6 |
| $B_{10}H_{10}(CHCC(=CH_2)CH_3)$ | 60 | 23.4 |
| Ammonyx T | 17.92 | 6.99 |
| Sulfole | 0.5 | 0.195 |
| AIBN | 1.5 | 0.585 |
| Water | 166.56 | 65.0 |

The charge was placed in an 8 oz. bottle with a monomer charge ratio approximately equal to the combining ratio as determined from previous runs. The bottle was maintained in the bath for a total of 48½ hours, at a temperature of 62° to 64° C. An excellent emulsion was obtained, and yellowish solid material was present around the bottle. The latex was coagulated with hydrochloric acid, and a large quantity of rubbery product was obtained. The yellowish material in the bottle was sticky and elastic; it was removed separately and washed in the methanol. The bulk of the product from the latex was washed in methanol. Both portions then were dried in a vacuum. The bulk of the product, which was tough and sticky, weighed 32.6228 g., and was found to contain 31.7, 31.1 percent boron. The sticky material, not in the emulsion, weighed 3.57 g., and was found to contain 25.1, 25.2 percent boron. The conversion of monomers was approximately 80 percent as calculated from the yield.

Examples XIII through XVII were performed in the same manner as Example XII, except that in Example XIII, undistilled $B_{10}H_{10}(CHCC(=CH_2)CH_3)$ containing approximately one percent decaborane as a major impurity was used as a starting material. Conversion dropped to 30 percent and the polymer was not in an emulsion at the end of the reaction period. Although the boron content was 24.2 percent, the polymer was a viscous liquid.

EXAMPLE XVIII

| Material | Formula parts | Grams used |
| --- | --- | --- |
| Butadiene | 10.0 | 0.59 |
| $B_{10}H_{10}(CHCCH=CH_2)$ | 90.0 | 4.50 |
| Ammonyx T | 17.92 | 0.896 |
| Sulfole | 0.5 | 0.025 |
| AIBN | 0.525 | 0.026 |
| Water | 166.56 | 8.328 |

The charge was prepared in an 8 oz. bottle, and polymerized at 50° C. for 48 hours. The bottle was then opened, after venting off the very little excess butadiene. No solid material was apparent in the latex. The latex was diluted with water and transferred to a beaker. A small quantity of rubbery material adhered to the sides of the bottle. This was scraped out and added to a tared dish. The latex was coagulated with dilute hydrochloric acid and a quantity of sticky elastomeric material coagulated. This was transferred to the tared dish, washed several times with water and then with methanol. The serum and all rinsings were kept in a tared beaker. The elastic product was placed in a vacuum desiccator. The product, when dried, was a sticky, highly elastic, semi-fluid polymer weighing 1.7031 g. It was found by duplicate chemical analyses to contain 27.8, 26.2 percent boron.

EXAMPLE XIX

| Material | Formula parts | Grams used |
| --- | --- | --- |
| Butadiene | 5.0 | 0.25 |
| $B_{10}H_{10}(CHCCH=CH_2)$ | 95.0 | 4.75 |
| Ammonyx T | 17.92 | 0.896 |
| Sulfole | 5.0 | 0.24 |
| AIBN | 0.525 | 0.0264 |
| Water | 166.56 | 8.328 |

The materials were charged in a 2 oz. square bottle with a metal cap containing self-sealing gaskets. The bottle was placed in the bath at 50° C. After about 17 hours, the bath temperature was at 56° C. The bottle was left in the bath for a total of 48 hours, at approximately 50° C. The latex was coagulated with dilute hydrochloric acid. Layers of what appeared to be liquid product formed at the top. The liquid was scooped into a beaker and dried at room temperature in a vacuum desiccator. The product was found to weigh 0.8858 g. and contained 25.4 percent boron.

EXAMPLE XX

| Material | Formula parts | Grams used |
| --- | --- | --- |
| Butadiene | 10.0 | 0.50 |
| $B_{10}H_{10}(CHCCH=CH_2)$ | 90.0 | 4.50 |
| Sulfole | 0.5 | 0.025 |
| Sodium fatty acid soap | 4.3 | 0.2158 |
| $K_2S_2O_8$ | 0.23 | 0.011 |
| Water | 180 | 9.0187 |

The materials were charged in a 2 oz. square bottle with a metal cap containing self-sealing gaskets. The bottle was placed in the bath at 50° C. After about 17 hours, the bath temperature was at 56° C. The bottle was left in the bath for a total of 48 hours, at approximately 50° C. The latex was coagulated with dilute hydrochloric acid. A creamy, soft mass was formed, which was transferred to a beaker and dried at room temperature in a vacuum desiccator. The dried product was found to weigh 1.3364 g. and was found by chemical analysis to contain 27.5 percent boron.

Example XXI shown in Table I was performed in a manner similar to that employed in Example XIX.

Table I

| Example | I | II | III | IV | V | VI | VII | VIII | IX | X |
|---|---|---|---|---|---|---|---|---|---|---|
| $B_{10}H_{10}C(H)C(\overset{CH_2}{\underset{\|}{C}}-CH_3)$ | 80 | 80 | 80 | 90 | 90 | 90 | 95 | 90 | 90 | 90 |
| $B_{10}H_{10}C(H)C(CH=CH_2)$ | | | | | | | | | | |
| Butadiene | 20 | 20 | 20 | 10 | 10 | 10 | 5 | 10 | 10 | 10 |
| Ammonyx T | | | 17.92 | | 17.92 | 17.92 | 17.92 | 17.92 | 17.92 | 17.92 |
| NaFa soap | 4.3 | 4.3 | | 4.3 | | | | | | |
| $K_2S_2O_8$ | 0.23 | 0.23 | | 0.23 | | | | | | |
| AIBN | | | 0.525 | | 0.525 | 0.525 | 0.525 | 0.525 | 0.525 | 1.00 |
| Sulfole | 0.5 | 0.5 | 0.5 | 0.5 | 0.5 | 0.5 | 5.0 | 0.5 | 0.5 | 0.5 |
| Water | 180 | 180 | 166.6 | 180 | 166.6 | 166.6 | 166.6 | 166.6 | 166.6 | 166.6 |
| Temperature, °C | 50 | 50 | 50 | 50 | 50 | 50 | 50 | 60 | 60 | 60 |
| Time, hours | 24 | 47 | 47 | 48 | 48 | 48 | 48 | 48 | 48 | 48 |
| Conversion, percent[1] | 21 | 20 | 38 | | 22 | 23 | 12 | 22 | | 25 |
| Boron content, percent | 24 | 32.6 | 31.0 | 7.7 | 28.1 | 33.8 | 28.9 | 34.7 | 35.3 | { 35.0 / 34.9 } |
| Borane monomer in polymer, percent | 42 | 57 | 54.5 | 13.5 | 49 | 59 | 51.6 | 61.9 | | |
| Properties | [2] | [2] | [2] | [2] | [3] | [2] | [4] | [3] | [2] | [2] |

| Example | XI | XII | XIII | XIV | XV | XVI | XVII | XVIII | XIX | XX | XXI |
|---|---|---|---|---|---|---|---|---|---|---|---|
| $B_{10}H_{10}C(H)C(\overset{CH_2}{\underset{\|}{C}}-CH_3)$ | 90 | 60 | 60 | 60 | 60 | 60 | 60 | | | | |
| $B_{10}H_{10}C(H)C(CH=CH_2)$ | | | | | | | | 90 | 95 | 90 | 90 |
| Butadiene | 10 | 40 | 40 | 40 | 40 | 40 | 40 | 10 | 5 | 10 | 10 |
| Ammonyx T | 17.92 | 17.92 | 17.92 | 17.92 | 17.92 | | 17.92 | 17.92 | 17.92 | | 17.92 |
| NaFa soap | | | | | | 4.3 | | | | 4.3 | |
| $K_2S_2O_8$ | | | | | | 0.23 | | | | 0.23 | |
| AIBN | 1.50 | 1.50 | 1.50 | 1.50 | 1.50 | | 1.50 | 0.525 | 0.525 | | 0.525 |
| Sulfole | 0.5 | 0.5 | 1.0 | 1.0 | 0.5 | 0.5 | 1.0 | 0.5 | 5.0 | 0.5 | 0.5 |
| Water | 166.56 | 166.56 | 166.56 | 166.56 | 166.56 | 180 | 166.56 | 166.6 | 166.6 | 180 | 180 |
| Temperature, °C | 60 | 52-60 | 60 | 60 | 60 | 60 | 60 | 50 | 50 | 50 | 60 |
| Time, hours | 48.5 | 48.5 | 58 | 58 | 58 | 58 | 48 | 48 | 48 | 48 | 48 |
| Conversion, percent[1] | 22 | 80 | 30.2 | 72.8 | 70.4 | 63.6 | | 33 | 18 | 27 | 18 |
| Boron content, percent | { 37.5 / 37.8 } | { 25.1 / 31.7 } | 24.2 | 28.5 | 29.4 | | | 27 | 25.4 | 27.5 | 28.3 |
| Borane monomer in polymer, percent | | | | | | | | 43.5 | 39.0 | 42.3 | 43.5 |
| Properties | [5] | [6] | [5] | [2] | [2] | [6] | [2] | [4] | [5] | [2] | [2] |

[1] Based on total monomers.    [2] Soft elastic solid.    [3] Firm elastic solid.
[4] Soft, semi-liquid elastomer.    [5] Liquid elastomer.    [6] Tough elastic solid.

The true copolymeric nature of the product of this invention was established by exhaustive extraction of the product, and by fractional molecular weight precipitation. In the exhaustive extraction, a sample of the copolymer obtained in Example X weighing 3.0792 g. was placed in a Soxhlet extractor having a water condenser. 250 ml. of methanol was placed in the flask, and heat sufficient for a gentle boil was supplied. The sample was continuously extracted for 6 days, with samples weighing 0.6524 g., 0.3731 g., 0.5626 g., being taken on the first, second and third days respectively. On the sixth day, the extraction was stopped and the remainder of the sample was placed in a vacuum desiccator. Duplicate chemical analyses of the extracted samples showed 31.1, 31.4 percent boron on the first day, 29.1, 26.3 percent boron on the second day, 26.8, 26.0 percent boron on the third day and 25.89 percent boron after extraction for 6 days.

These analyses establish that the $$B_{10}H_{10}(CHCC(=CH_2)CH_3)/\text{butadiene}$$

product is a true copolymer containing approximately 26 percent boron. The higher boron content of the initial product (35 percent) can be attributed to the presence of some trapped $B_{10}H_{10}(CHCC(=CH_2)CH_3)$ which the methanol extraction removed. The physical characteristics of the copolymer were essentially unchanged after this extraction, again attesting to the true nature of the product.

In the fractional molecular weight precipitation, the initial polymer was dissolved in benzene, methanol was added to the point of incipient precipitation, and any insoluble material was allowed to settle slowly and was removed. This was repeated two more times on the filtrate. The three precipitates represent different molecular weight ranges. In this procedure, a 2.0824 g. sample of the copolymer obtained in Example X was dissolved in 100 ml. of benzene. 20 ml. of methanol were added, but no precipitation occurred. An additional 18 ml. of methanol were added, and a fraction settled out. This was transferred to a beaker and found to weigh 0.0416 g. corresponding to 2 percent of the sample. An additional 2 ml. of methanol were added, but no precipitation occurred. Upon the addition of 8 ml. of methanol, a small fraction precipitated. This was transferred to a beaker and found to weigh 0.2764 g., corresponding to 13.27 percent of the sample. An additional 10 ml. of methanol were added in increments, resulting in poor separation of a fraction. When obtained, this was transferred to a beaker and found to weigh 0.2933 g. corresponding to 14.08 percent of the copolymer sample. Chemical analysis showed the first fraction to contain 27.0, 27.7 percent boron, the second fraction to contain 28.6 percent boron, and the third fraction to contain 25.4 percent boron. The close agreement between the boron contents of these varying molecular weight ranges and that of the extracted polymer is additional evidence for the existence of a true copolymer.

The average molecular weight of a sample of the solid $B_{10}H_{10}(CHCC(=CH_2)CH_3)$ butadiene copolymer as prepared in Example XV has been measured by means of light-scattering apparatus and found to be 270,000.

The boron-containing solid material produced by practicing the method of this invention can be employed as an ingredient of solid propellant compositions in accordance with general procedures which are well-understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing one of the present boron-containing materials, generally from 10 to 35 parts by weight of boron-containing material and from 65 to 90 parts by weight of oxidizer, such as ammonium perchlorate are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain a binder such as an artificial resin generally of the urea-formaldehyde or phenol-formaldehyde type, the function of the resin being to give the propellant added mechanical strength and at the same time improve its burning characteristics. Thus, in manufacturing a suitable propellant proper proportions of finely divided oxidizer and finely divided boron-containing material can be admixed with a high solids content solution of partially condensed urea-formaldehyde or phenol-formaldehyde resin, the proportions being such that the amount of the resin is about 5 to 10 percent by weight, based upon the weight of the oxidizer and the boron-containing material. The ingredients are thoroughly mixed and following this the mixture is molded into the desired shape, as by extrusion. Thereafter, the binder can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

Propellant compositions can also be prepared using as an oxidizable material a boron-containing fuel such as $B_{10}H_{10}(CHCC(=CH_2)CH_3)$ or a conventional fuel together with an oxidizer and employing one or more of the products of this invention as a binder or fuel-binder.

The following examples illustrate solid propellant compositions containing the copolymers of this invention. Propellant formulations were prepared containing the copolymer as the solid fuel component and containing the copolymer as a fuel-binder together with another solid fuel.

EXAMPLE XXII

The composition of the propellant mix was as follows:

| Ingredient | Amount, g. | Function |
|---|---|---|
| Liquid butadiene/$B_{10}H_{10}(CHCC(=CH_2)CH_3)$ | 12 | Fuel-binder. |
| $B_{10}H_{10}(CHCC(=CH_2)CH_3)$ | 12 | Fuel. |
| Ammonium perchlorate | 75 | Oxidizer. |
| Zinc oxide | 0.03 | Accelerator activator |
| Carbon black | 0.1 | Ballistic modifier. |
| Sulfur | 0.2 | Curing agent. |
| Captax (mercaptobenzothiazole) | 0.1 | Primary accelerator. |
| Methyl Tuads (tetramethylthiuram disulfide) | 0.1 | Primary accelerator. |
| Methyl Zimate (zinc dimethyldithiocarbamate) | 0.1 | Secondary accelerator. |

The weighed amount of copolymer and $$B_{10}H_{10}(CHCC(=CH_2)CH_3)$$

were heated at 60° C. to melt the $$B_{10}H_{10}(CHCC(=CH_2)CH_3)$$

(melting point ca. 45° C.) and decrease the viscosity of the copolymer. The ammonium perchlorate, which was stored under vacuum at 115° C. at all times, and the carbon black were weighed out and placed in an 80 ml. capacity covered Brabender Plastograph (internal mixer) which was maintained at 45° C. These were mixed for 15 minutes to bring them to the temperature of the mixer. The mixer was turned on and off by remote control. The copolymer, $B_{10}H_{10}(CHCC(=CH_2)CH_3)$ and weighed amounts of the dry curing ingredients were added to the ammonium perchlorate-carbon black mixture. The cover was put on and the mixer started. After 1.5 hours of mixing, the mixer was stopped, the cover was removed and the propellant removed. The propellant was spread on a piece of aluminum foil and placed in a vacuum chamber, where it was degased for 30 minutes at ambient temperature. The uncured propellant was then placed in a stainless steel mold with an aluminum foil lined cavity which was 2 in. x 5 in. thick. The cover plate of the mold was put on and the mold was placed in a Carver 10 ton laboratory hydraulic press. By remote control, pressure was applied to the press (5000 p.s.i.) and the heat was turned on. The propellant was cured for 24 hours at 95° C., after which the heat was turned off and the pressure was released. When cool, the mold was removed from the press and the cured slab was removed from the mold.

Different shape molds were used, depending on the required tests. The above cure was obtained in slab form for cutting into strands to be used to determine the rate of burning. Results from this determination are shown in Table II.

Examples XXIII and XXIV were performed in a similar manner, except that in Example XXIII, the ingredients were mixed by hand.

Table II

| Example | XXIII | XXII | XXIV |
|---|---|---|---|
| Ingredients, grams: | | | |
| Copolymer $B_{10}H_{10}(CHCC(=CH_2)CH_3)$/butadiene of Example | 1.0/XII | 12/XII | 12/XII, XIII [1]. |
| Carbon black | 0.01 | 0.1 | 0.2. |
| Ammonium perchlorate | 3.0 | 75 | 75. |
| $B_{10}H_{10}(CHCC(=CH_2)CH_3)$ | None | 12 | 12. |
| Sulfur | 0.02 | 0.2 | 0.2. |
| Methyl Tuads | 0.01 | 0.1 | 0.1. |
| Methyl Zimate | 0.01 | 0.1 | 0.1. |
| Captax | 0.01 | 0.1 | 0.1. |
| Zinc oxide | 0.03 | 0.03 | 0.03. |
| Percent boron in binder and fuel (calculated) | 35 | 45 | 45. |
| Processing: | | | |
| Mix time, hr | Hand mixed | 3.0 (slow speed) | 1.5 (fast speed). |
| Mix temperature °C | Ambient | 45 | 45. |
| Precure time, hr | | 1.0 [2] | 1.0 [2] |
| Precure temperature, °C | | Ambient | Ambient. |
| Cure time, hr | 24 | 24 | 48. |
| Cure temperature, °C | 90 | 95 | 90. |
| Remarks | Short pot life but excellent cured specimen. | Rubbery, slightly porous | Rubbery, good cure. |
| Hardness, Shore A | | 59–65 | 70. |
| Burning rate, in./sec.: | | | |
| 500 p.s.i. | | 1.44 | |
| 1,000 p.s.i. | | 1.85 | Auto ignition temp., 340° C. |
| 1,500 p.s.i. | | 2.27 | |
| Pressure exponent (n) | | 0.41 | |

[1] 1:1 mixture.   [2] Under reduced pressure.

We claim:

1. A method for the production of an organoboron copolymer which comprises copolymerizing in an emulsion polymerization system containing water, an emulsifier and an emulsion polymerization catalyst a conjugated diolefin hydrocarbon with a compound of the class RR'B$_{10}$H$_8$(CR''CR''') wherein R and R' are each selected from the class consisting of hydrogen and an alkyl radical containing from one to five carbon atoms, wherein R'' and R''' each are selected from the class consisting of hydrogen, an alkyl radical and a monoalkenyl hydrocarbon radical, at least one of R'' and R''' being a monoalkenyl hydrocarbon radical, the total number of carbon atoms in R'' and R''' taken together not exceeding eight.

2. The method of claim 1 in which the conjugated diolefin hydrocarbon is butadiene.

3. The method of claim 1 in which said compound is B$_{10}$H$_{10}$(CHCC(=CH$_2$)CH$_3$).

4. The method of claim 1 in which said compound is B$_{10}$H$_{10}$(CHCCH=CH$_2$).

5. The method of claim 1 in which the conjugated diolefin hydrocarbon is butadiene and said compound is B$_{10}$H$_{10}$(CHCC(=CH$_2$)CH$_3$).

6. The method of claim 1 in which the conjugated diolefin hydrocarbon is butadiene and said compound is B$_{10}$H$_{10}$(CHCCH=CH$_2$).

7. An organoboron copolymer of a conjugated diolefin hydrocarbon with a compound of the class $$RR'B_{10}H_8(CR''CR''')$$

wherein R and R' are each selected from the class consisting of hydrogen and an alkyl radical containing from one to five carbon atoms, wherein R'' and R''' are each selected from the class consisting of hydrogen, an alkyl radical and a monoalkenyl hydrocarbon radical, at least one of R'' and R''' being a monoalkenyl hydrocarbon radical, the total number of carbon atoms in R'' and R''' taken together not exceeding eight.

8. An organoboron copolymer of butadiene with $$B_{10}H_{10}(CHCC(=CH_2)CH_3)$$

9. An organoboron copolymer of butadiene with $$B_{10}H_{10}(CHCCH=CH_2)$$

No references cited.